United States Patent
Jinnai et al.

(10) Patent No.: US 10,864,879 B2
(45) Date of Patent: Dec. 15, 2020

(54) HEAD PROTECTION AIRBAG DEVICE

(71) Applicant: TOYODA GOSEI CO., LTD., Kiyosu (JP)

(72) Inventors: Ryosuke Jinnai, Kiyosu (JP); Makoto Yamanaka, Kiyosu (JP); Kunihiro Aikawa, Kiyosu (JP); Hiroki Imaeda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 58 days.

(21) Appl. No.: 16/356,466

(22) Filed: Mar. 18, 2019

(65) Prior Publication Data
US 2019/0299907 A1  Oct. 3, 2019

(30) Foreign Application Priority Data

Mar. 30, 2018 (JP) .............................. 2018-067423

(51) Int. Cl.
*B60R 21/232* (2011.01)
*B60R 21/213* (2011.01)
*B60R 21/00* (2006.01)

(52) U.S. Cl.
CPC .......... *B60R 21/213* (2013.01); *B60R 21/232* (2013.01); *B60R 2021/0048* (2013.01)

(58) Field of Classification Search
CPC ................ B60R 21/213; B60R 21/232; B60R 2021/0048
USPC ..................................................... 280/730.2
See application file for complete search history.

(56) References Cited

U.S. PATENT DOCUMENTS

| | | | | |
|---|---|---|---|---|
| 7,735,854 B2* | 6/2010 | Chang | ................. | B60R 13/0225 |
| | | | | 280/728.2 |
| 7,837,225 B2* | 11/2010 | Gosis | ................. | F16B 19/1081 |
| | | | | 280/730.2 |
| 8,955,874 B2* | 2/2015 | Kim | ...................... | B60R 21/213 |
| | | | | 280/730.1 |
| 9,114,774 B2* | 8/2015 | Heigl | .................... | B60R 21/213 |
| 9,115,743 B2* | 8/2015 | Yamamoto | ............ | F16B 21/065 |
| 9,216,711 B2* | 12/2015 | Kawamura | ........... | B60R 21/213 |
| 9,505,368 B2* | 11/2016 | Morrell | .................... | F16B 21/02 |
| 9,539,976 B2* | 1/2017 | Jinnai | ................... | B60R 21/201 |
| 9,592,786 B2* | 3/2017 | Yamamoto | ............ | B60R 21/213 |
| 9,855,911 B2* | 1/2018 | Konaka | ................ | B60R 21/215 |
| 10,661,745 B2* | 5/2020 | Kakimoto | ............. | B60R 21/201 |

(Continued)

FOREIGN PATENT DOCUMENTS

JP  2011-068276 A  4/2011

*Primary Examiner* — Ruth Ilan
(74) *Attorney, Agent, or Firm* — Posz Law Group, PLC

(57) ABSTRACT

Ahead protection airbag device includes an airbag. The airbag includes: a hag main body; and an attachment member configured to attach the bag main body to a predetermined attachment part. The attachment member includes: an attachment substrate; a neck part protruding from the attachment substrate; and an engaging head part arranged with being bulged at a tip end of the neck part. The bag main body has an insertion hole in which the neck part is inserted so as to enable the engaging head part to protrude from an outer surface-side of a folded body of the bag main body. The attachment substrate is arranged at a backside of a peripheral edge of the insertion hole so that the attachment member is attached to the bag main body.

2 Claims, 16 Drawing Sheets

(56) References Cited

U.S. PATENT DOCUMENTS

2006/0197317 A1\* 9/2006 Watanabe ............. B60R 21/213
280/728.2

\* cited by examiner

FIG.3
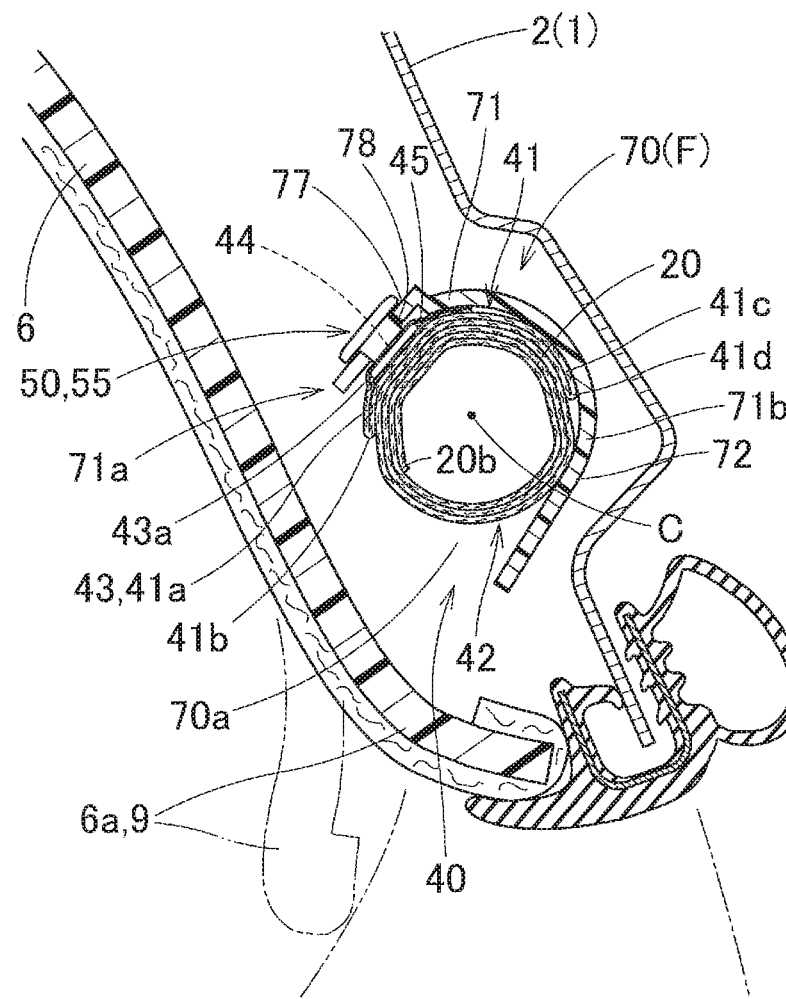
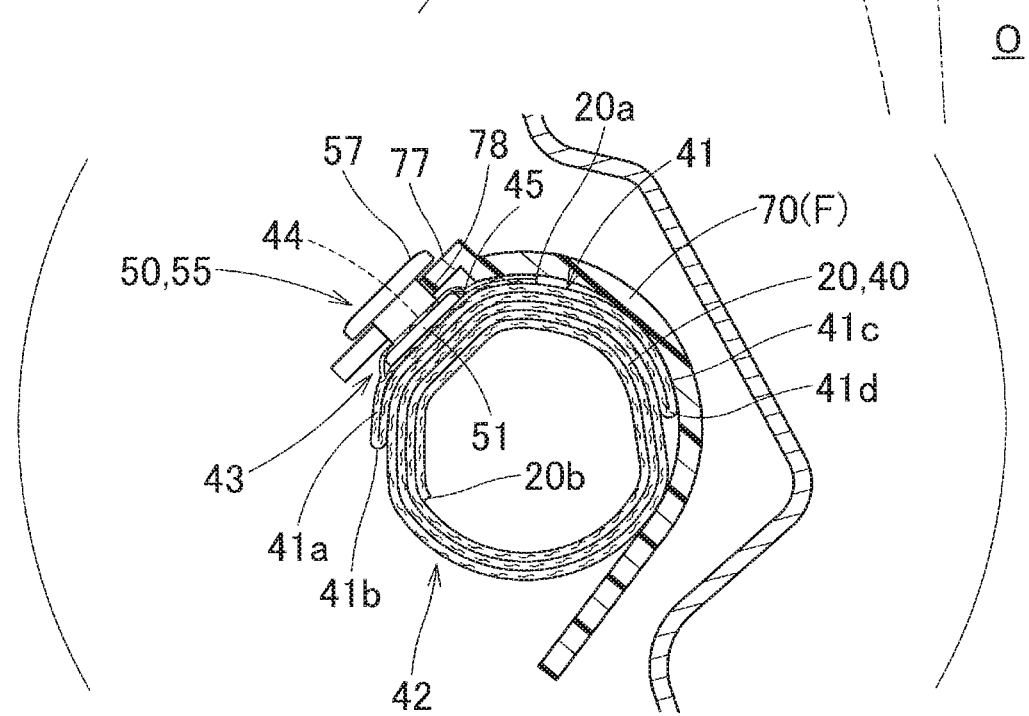

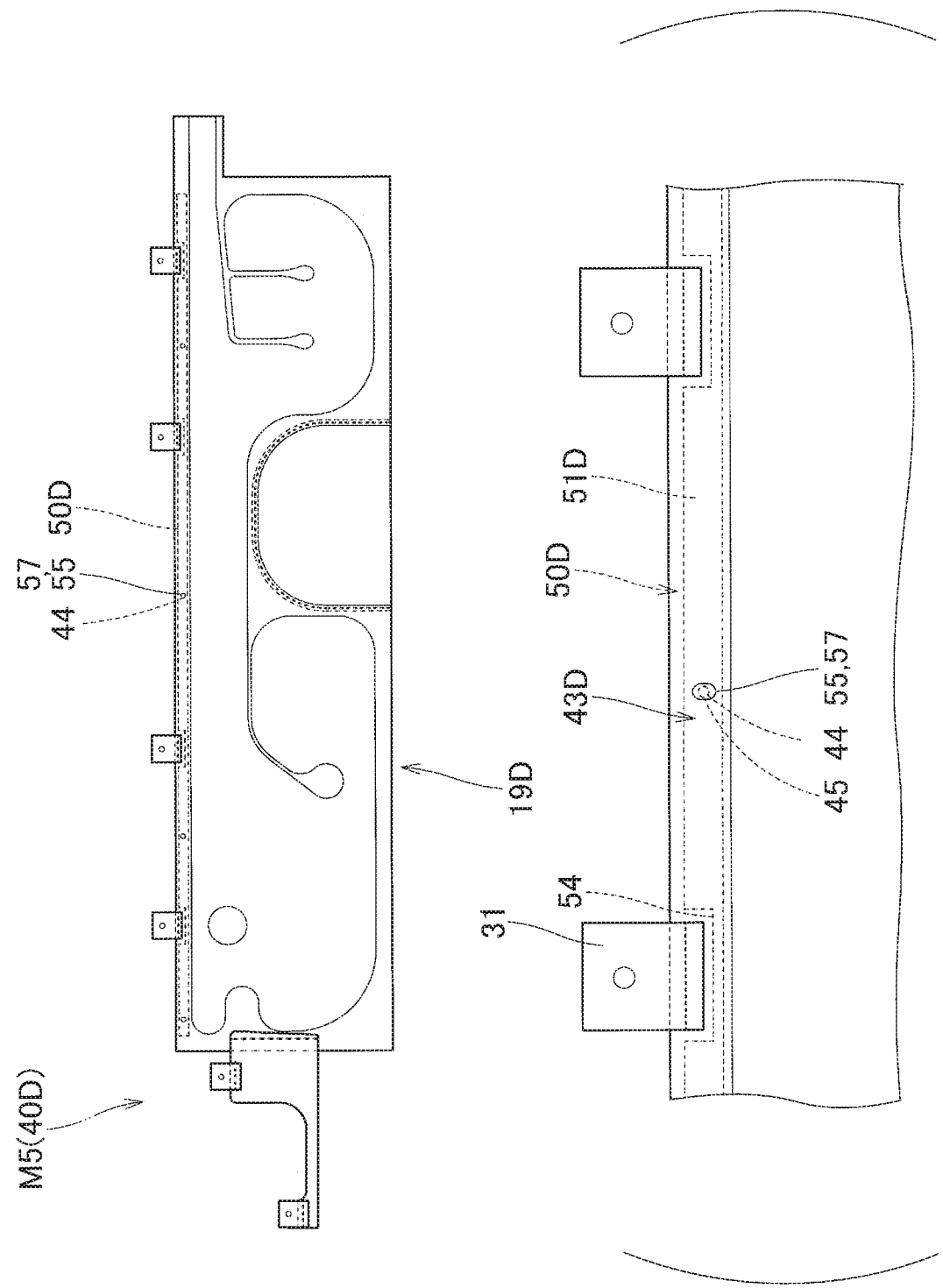

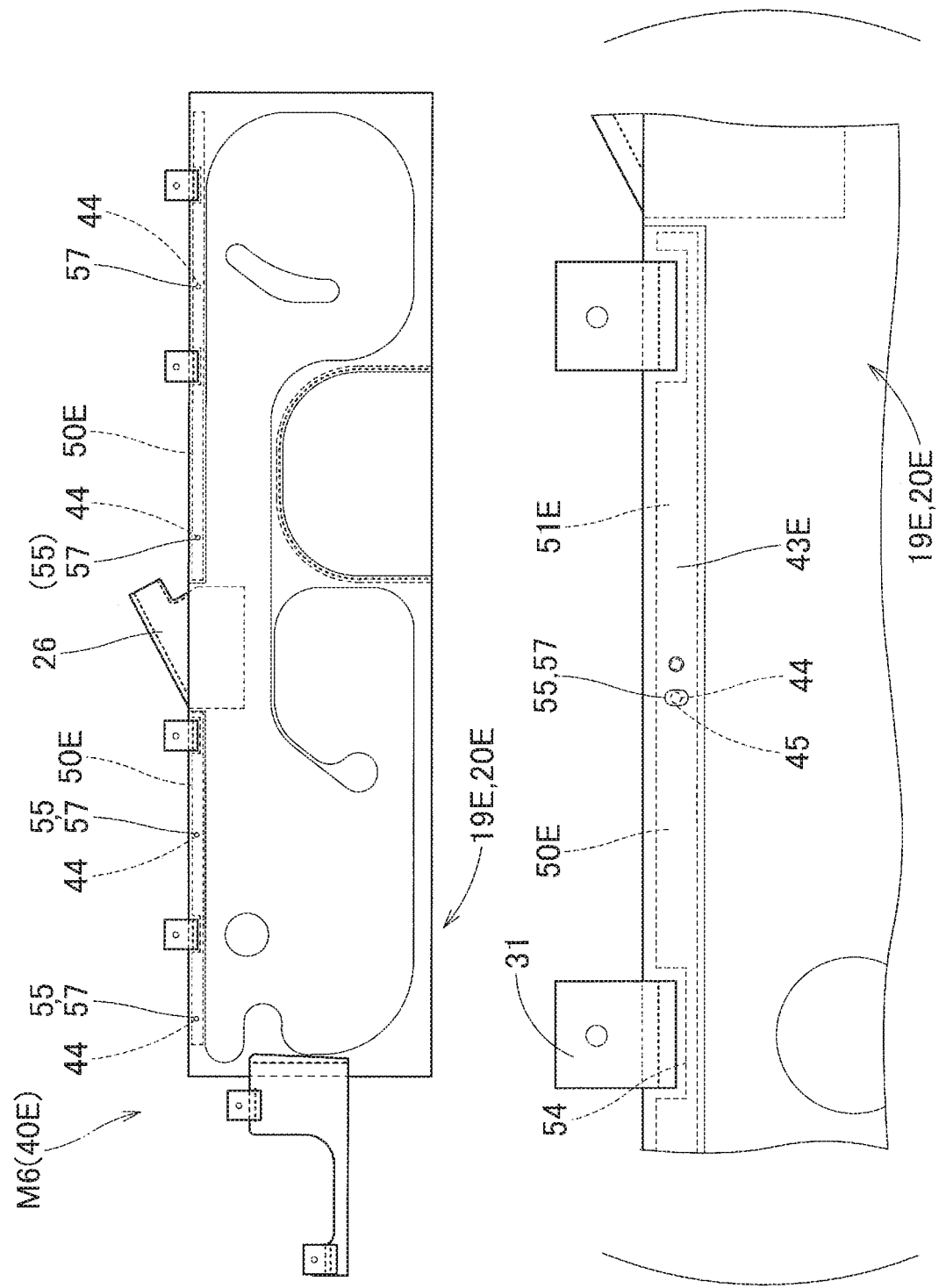

HEAD PROTECTION AIRBAG DEVICE

CROSS-REFERENCE TO RELATED APPLICATIONS

This application is based upon and claims the benefit of priority from prior Japanese patent application No. 2018-067423, filed on Mar. 30, 2018, the entire contents of which are incorporated herein by reference.

TECHNICAL FIELD

The present invention relates to a head protection airbag device including an airbag accommodated with being folded at an upper edge-side of a window of a vehicle and configured to deploy and inflate so as to cover the window upon inflow of an inflation gas.

BACKGROUND ART

In a head protection airbag device of the related art, when mounting a folded airbag to a predetermined mounting part of a vehicle, for example, when accommodating the folded airbag in a case (protector) for protecting the airbag and mounting the case to the mounting part, the airbag is positioned with respect to the case and is then accommodated in the case so that the airbag is to be mounted to the vehicle at a predetermined posture (for example, refer to Patent Document 1). Specifically, the airbag is positioned with respect to the case by insertion of an attachment piece part (an attachment tap), which is to be attached to a body-side of the vehicle, of the airbag into a through-hole (slit) of the case and by adhesion of an adhesive tape over the folded airbag and the case.

Patent Document 1: JP-A-2011-68276 (pages 5 to 7, FIG. 1)

However, in the related-art positioning, when using the adhesive tape, the adhesive tape is bonded to an outer peripheral surface of the folded airbag arranged in the case, i.e., an outer peripheral surface of the airbag exposed from an opening part for protrusion of the case and to the case at both edges of the opening part. Therefore, the adhesive tape may be bonded in a state where the folded airbag is positionally misaligned with being rotated in a circumferential direction. Thus, there is a room for improvement in correctly positioning and arranging the airbag in the case.

The present invention has been made in view of the above situations, and is to provide a head protection airbag device capable of attaching a folded airbag to a predetermined attachment part without positional misalignment.

SUMMARY OF INVENTION

According to an aspect of the invention, there is provided a head protection airbag device comprising an airbag accommodated with being folded in an upper edge-side of a window of a vehicle and configured to deploy and inflate so as to cover the window upon inflow of an inflation gas, wherein the airbag includes: a bag main body; and an attachment member configured to attach the bag main body having been folded to a predetermined attachment part, the attachment member includes: an attachment substrate; a neck part protruding from the attachment substrate; and an engaging head part arranged with being bulged at a tip end of the neck part, and inserted in and engaged to the predetermined attachment part, the bag main body has an insertion hole in which the neck part is inserted so as to enable the engaging head part to protrude from an outer surface-side of a folded body of the bag main body having been folded, and the attachment substrate is arranged at a backside of a peripheral edge of the insertion hole so that the attachment member is attached to the bag main body.

BRIEF DESCRIPTION OF DRAWINGS

FIG. 3 is a schematic longitudinal sectional view taken along a line III-Ill of FIG. 1, depicting the state where the head protection airbag device of the first illustrative embodiment of the present invention is mounted to the vehicle.

FIG. 15 is a schematic front view and a partial enlarged view depicting a state where an airbag of a head protection airbag device of a fifth illustrative embodiment is deployed flat.

FIG. 16 is a schematic front view and a partial enlarged view depicting a state where an airbag of a head protection airbag device of a sixth illustrative embodiment is deployed flat.

DESCRIPTION OF EMBODIMENTS

Hereinafter, illustrative embodiments of the present invention will be described with reference to the drawings.

Figure 1:
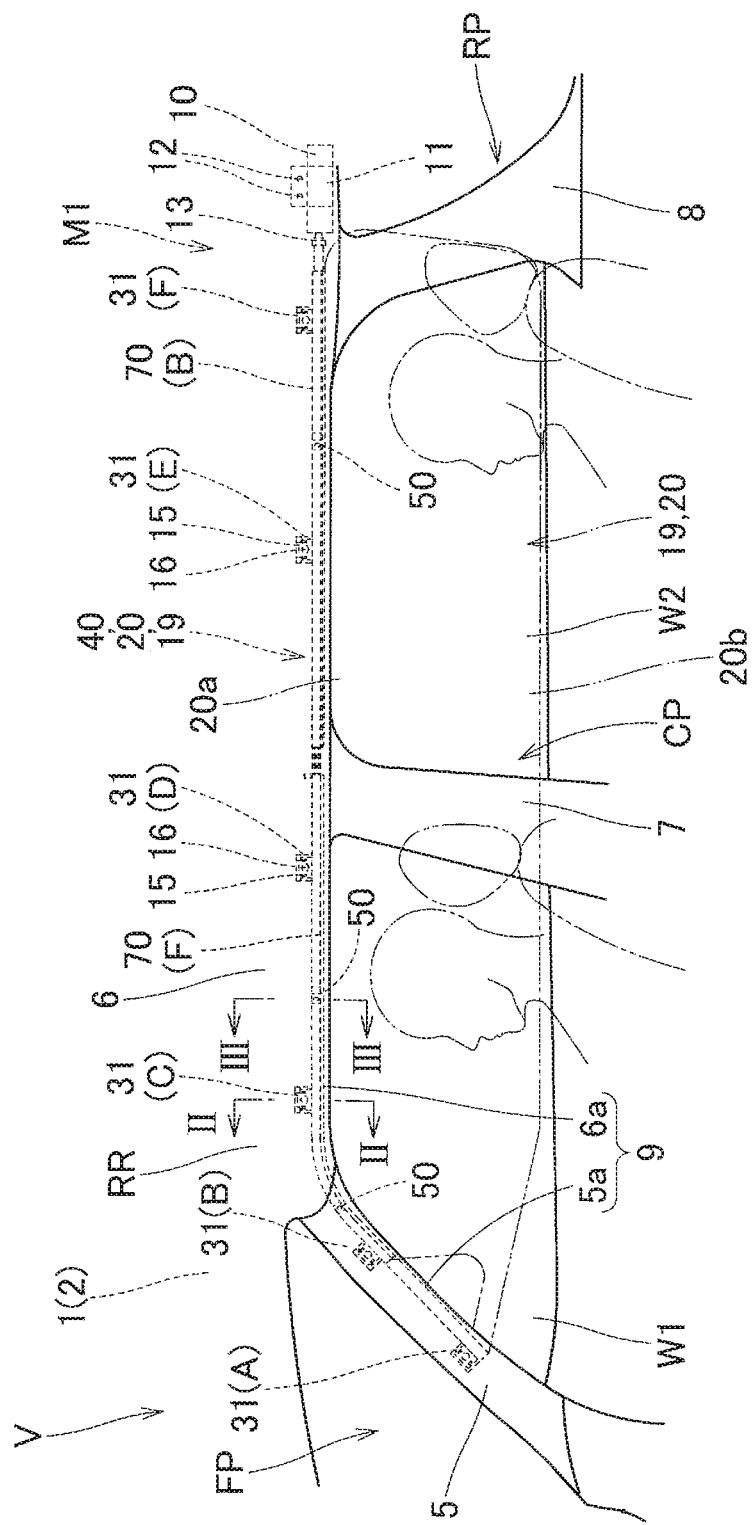
FIG. 1 is a front view depicting a state where a head protection airbag device of a first illustrative embodiment of the present invention is mounted to a vehicle, as seen from a vehicle interior-side.

As shown in FIG. 1, in a head protection airbag device M1 of a first illustrative embodiment, an airbag 19 is accommodated with being folded in peripheral edges of upper edges of windows (side windows) W1, W2 of a vehicle V, i.e., in a range from a front pillar part FP to a vicinity of the upper of a rear pillar part RP via a roof side rail part RR so as to cover the windows W1, W2 upon completion of deployment and inflation. In the meantime, the vehicle V has one intermediate pillar part CP arranged substantially in an upper and lower direction between the front pillar part FP and the rear pillar part RP, and the airbag 19 upon completion of the deployment and inflation is configured to cover not only the windows W1, W2 but also a vehicle interior-side of parts of an intermediate pillar garnish 7 of the intermediate pillar part CP and a rear pillar garnish 8 of the rear pillar part RP.

Figure 5:
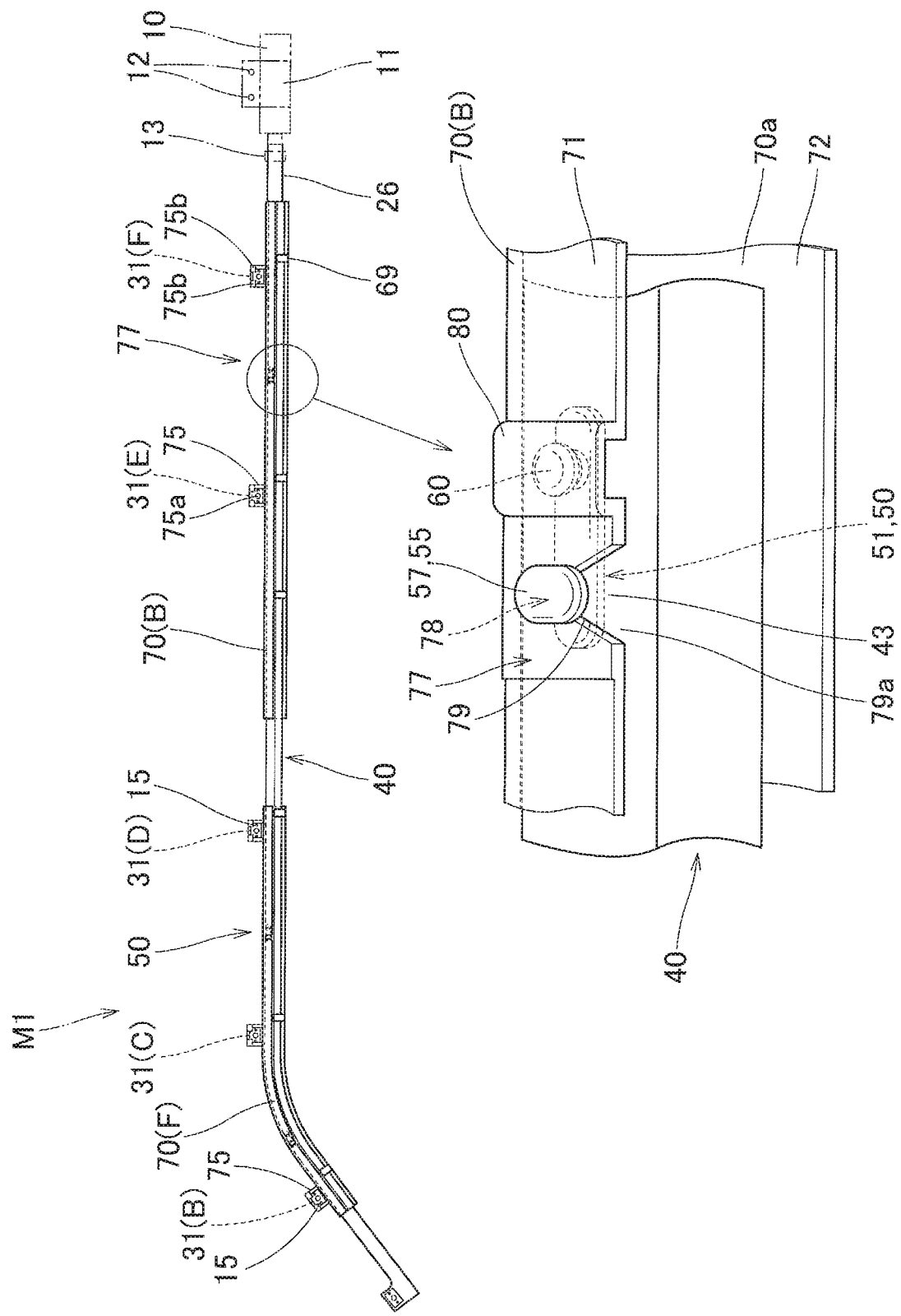
FIG. 5 is a schematic front view depicting a state where the folded airbag of the first illustrative embodiment is accommodated in a case.

As shown in FIGS. 1 and 5, the head protection airbag device M1 includes the airbag 19, an inflator 10 configured to supply an inflation gas into the airbag 19, attachment brackets 11, 15, attachment bolts 12, 16 and cases 70 (70F, 70B) configured to accommodate therein a folded body 40 of the folded airbag 19. The folded airbag 19, the inflator 10 and the cases 70 are accommodated with a vehicle interior-side 1 being covered by an airbag cover 9 when mounted to the vehicle V (refer to FIGS. 1 to 3). In the first illustrative embodiment, the airbag cover 9 is configured by a lower edge 5a of a front pillar garnish 5 configured to cover the vehicle interior-side of the front pillar part FP and a lower edge 6a of a roof head lining 6 configured to cover the vehicle interior-side of the roof side rail part RR.

The front pillar garnish 5 and the roof head lining 6 are attached to the vehicle interior-side 1 of an inner panel 2, which is a body 1-side member of the front pillar part FP and the roof side rail part RR, by an attaching means (not shown) made of synthetic resin, together with the intermediate pillar garnish 7 and the rear pillar garnish 8. The airbag cover 9 configured by the lower edges 5a, 6a is configured to be pushed by the airbag 19 and to thus open the lower edges 5a, 6a toward the vehicle interior-side 1 so that the airbag 19 can protrude upon the deployment and inflation (refer to the dashed-two dotted line in FIGS. 2 and 3).

The inflator 10 is formed to have a substantially circular column shape, and has a gas discharge port (not shown) provided at a tip end (a front end) for discharging the inflation gas. The inflator 10 is coupled to a connection port part 26 of the airbag 19 by inserting the tip end of the inflator including the gas discharge port into the connection port part 26 of a bag main body 20 and using a clamp 13 externally mounted to a rear end of the connection port part 26. Also, the inflator 10 is attached to the inner panel 2 by using the attachment bracket 11 for holding the inflator 10 and the attachment bolts 12 for fixing the attachment bracket 11 to the inner panel 2 of the body 1-side.

Figure 7A:
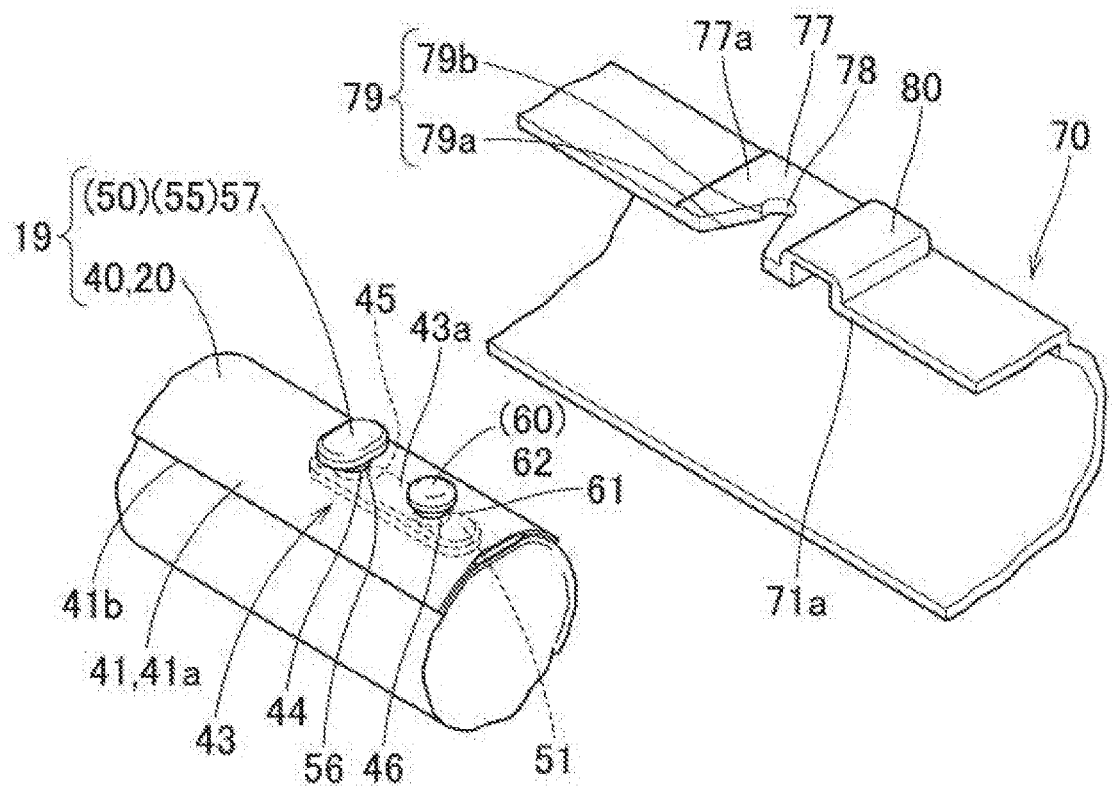
FIGS. 7A and 7B are perspective views depicting states where the attachment member of the first illustrative embodiment is attached to the bag main body, and the bag main body is accommodated in the case.
Figure 7B:
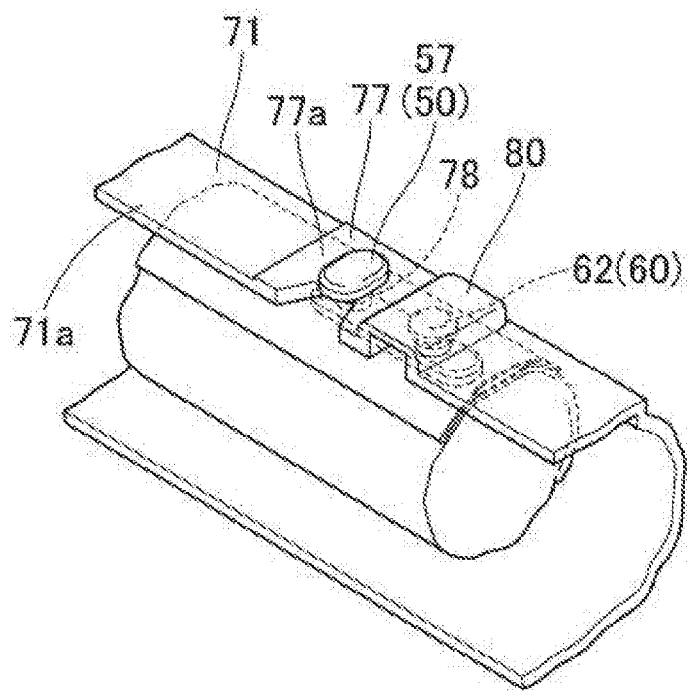

The airbag 19 includes the bag main body 20 and an attachment member 50 (refer to FIGS. 3, 7A and 7B). The bag main body 20 is a part that is to deploy and inflate so as to cover the windows W1, W2 by enabling the inflation gas to flow therein, as shown with the dashed-two dotted line in FIG. 1, and the attachment member 50 is a member for attaching a folded body 40 of the folded bag main body 20 to the cases 70(F, B) without positional misalignment, as shown in FIGS. 3, 7A and 7B.

Figure 2:
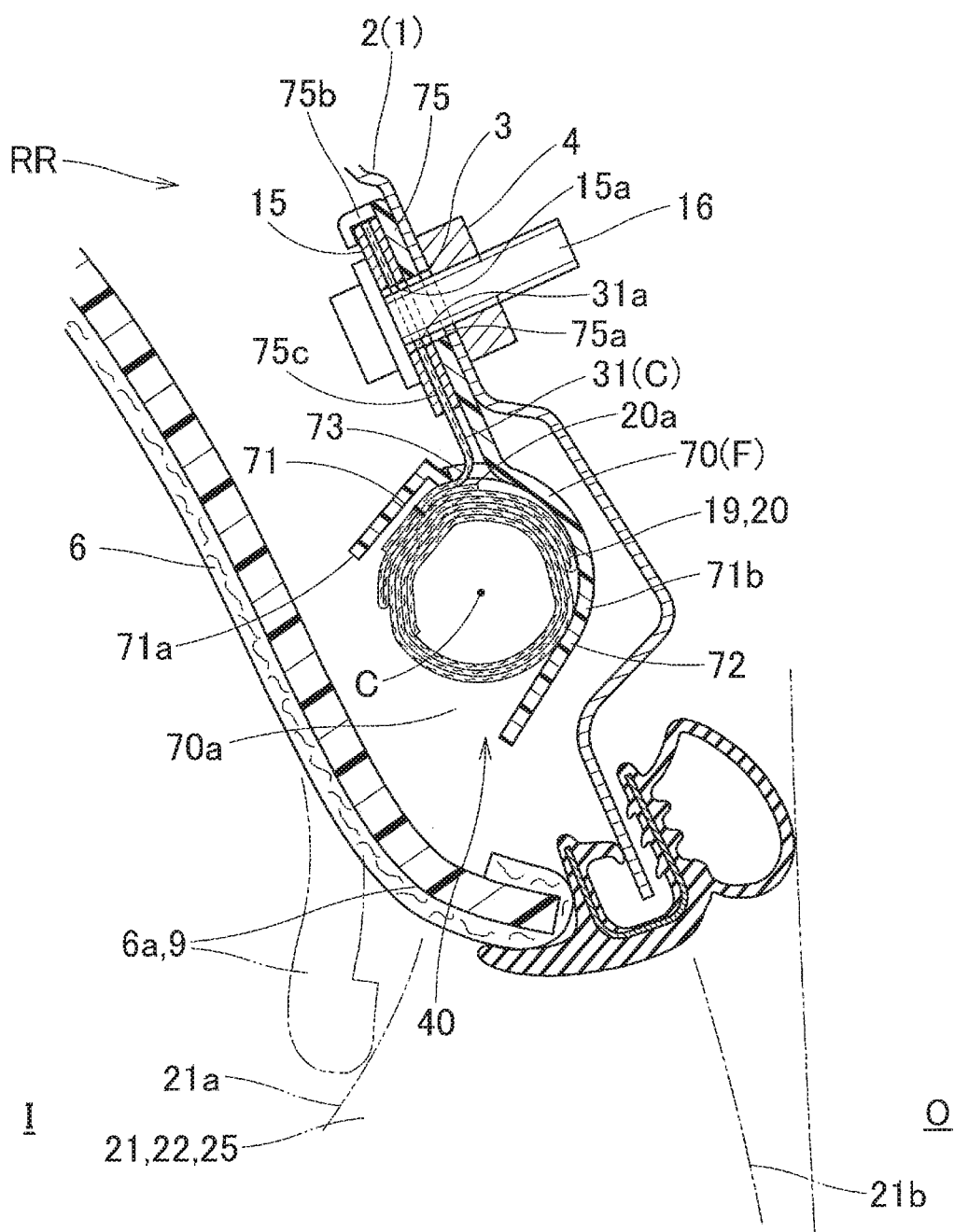
FIG. 2 is a schematic longitudinal sectional view taken along a line II-II of FIG. 1, depicting the state where the head protection airbag device of the first illustrative embodiment of the present invention is mounted to the vehicle.
Figures 4A, 4B:
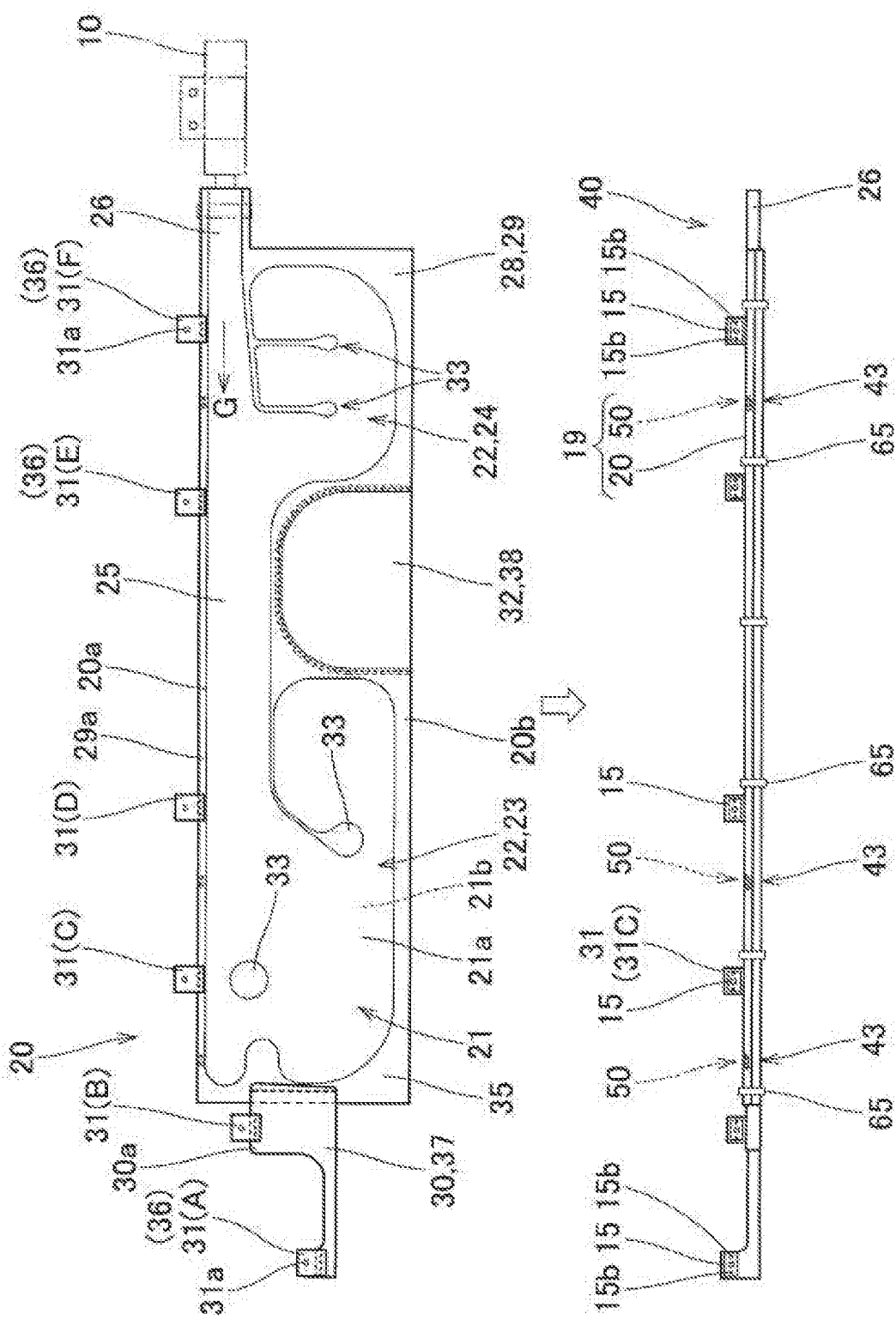
FIGS. 4A and 4B are schematic front views depicting states where a bag main body of the airbag of the first illustrative embodiment is deployed flat and is folded.

As shown with the dashed-two dotted line in FIGS. 2, 3 and 4A, the bag main body 20 has a gas inflow part 21 that is to inflate so as to space a vehicle interior-side wall part 21a and a vehicle exterior-side wall part 21b by enabling the inflation gas G to flow therein, and a non-inflow part 28 configured to join the vehicle interior-side wall part 21a and the vehicle exterior-side wall part 21b each other and not to permit the inflation gas G to flow therein. The gas inflow part 21 has a protective inflation part 22, a gas supply path part 25 and the connection port part 26, and the non-inflow part 28 has a peripheral edge part 29, an extension part 30, attachment piece parts 31, a plate-shaped part 32 and closing parts 33.

The protective inflation part 22 of the gas inflow part 21 has a front protection part 23 configured to cover the side window W1 of a front seat and a rear protection part 24 configured to cover the side window W2 of a rear seat upon completion of the deployment and inflation of the bag main body 20. Also, the gas supply path part 25 extends forward from the connection port part 26 of the rear end at an upper edge 20a of the bag main body 20, and is arranged to supply the inflation gas G from the connection port part 26 to the front protection part 23 and rear protection part 24. The connection port part 26 is arranged at the rear end of the upper edge 20a of the bag main body 20 so that the inflation gas G from the inflator 10 can be introduced into the protective inflation part 22.

The plate-shaped part 32 having a rectangular plate shape is arranged between the front protection part 23 and the rear protection part 24 at a lower edge 20b-side of the bag main body 20, and the closing parts 33 having diverse shapes are arranged in regions of the front protection part 23 and the rear protection part 24 so that the bag main body 20 upon the inflation can keep a plate shape extending in the front and rear direction with a thickness thereof being restrained. Also, the extension part 30 is arranged to extend forward from the front end of the bag main body 20. The plate-shaped part 32 and the extension part 30 are arranged so as to secure an overall shape of the bag main body 20 and to reduce a volume of a part into which the inflation gas G is to be introduced, thereby extremely shortening time after the inflation of the bag main body 20 starts until the inflation is completed. The peripheral edge part 29 of the non-inflow part 28 is arranged at an outer peripheral edge of the gas inflow part 21.

The plurality of attachment piece parts 31 is arranged to protrude upward from the upper edge 20a-side of the bag main body 20 and has attachment holes 31a for fixing the bag main body 20 to the inner panel 2 by using the attachment bolts 16. The attachment piece part 31 is arranged at an upper edge 30a-side of the extension part 30 attached to a front edge-side of the bag main body 20, too. Each attachment piece part 31 firmly fixes the bag main body 20 to the inner panel 2 by using the attachment bolt 16 inserted in each attachment hole 31a. One set of the two plate attachment brackets 15 is attached to each attachment piece part 31 with sandwiching a peripheral edge of the attachment hole 31a and being partially swaged. Each attachment piece part 31 is attached to the inner panel 2 by using the attachment bolt 16 passing through the attachment hole 15a of the attachment bracket 15 and the attachment hole 31a (refer to FIG. 2). In the meantime, swaged portions 15b of the attachment bracket 15 attached to the attachment piece part 31 are arranged at both front and rear sides of the attachment hole 15a (refer to FIG. 4B). Also, each attachment bolt 16 is threadably engaged with a nut 4 provided to an attachment hole 3 of the inner panel 2, thereby attaching each attachment piece part 31 to the inner panel 2 of the body 1-side of the vehicle V, together with the attachment bracket 15 and an attachment piece part 75 of the case 70 (which will be described later).

Also, as shown in FIGS. 4A and 4B, the bag main body 20 has a main body part 35 formed by double weaving using polyamide yarn, polyester yarn or the like, and separate body fabrics 36, 37, 38 made of woven fabrics of polyimide yarn, polyester yarn or the like and sewn to the main body part 35. The separate body fabric 36 configures a region of the attachment piece part 31, the separate body fabric 37 configures a region of the extension part 30, and the separate body fabric 38 configures a region of the plate-shaped part 32. The main body part 35 has a rectangular shape and is formed to have regions of the front protection part 23, the rear protection part 24, the gas supply path part 25, the peripheral edge part 29 and the plate-shaped part 32 by the double weaving. In the meantime, the region of the plate-shaped part 32 manufactured by the double weaving is a region that forms an inner tube (not shown) in the connection port part 26 by cutting the region. The cut region is sewn and closed by the separate body fabric 38, so that the plate-shaped part 32 is formed.

The bag main body 20 is formed with a plurality of (three, in the first illustrative embodiment) attachment seats 43 for attaching the attachment members 50 to an upper edge 29a-side of the peripheral edge part 29, in correspondence to the attachment members 50. Each of the attachment seats 43 has two large and small insertion holes 44, 46 (refer to FIGS. 7A and 7B). The attachment seat 43 is arranged at the upper edge-side when the bag main body 20 is folded.

Specifically, as shown in FIGS. 3, 7A and 7B, the folded body 40 formed by folding the bag main body 20 has such a shape that the lower edge 20b-side of the bag main body 20 deployed flat is wrapped at a vehicle exterior-side O and is roll-folded to come close to the upper edge 20a-side, the upper edge 20a-side of the bag main body 20, which is a remaining part of the roll folded part 42, is an accordion folded part having fold lines 41b, 41d formed in the front and rear direction, and the accordion folded part 41 is provided on the roll folded part 42. Each of the attachment seats 43 is arranged so that the insertion holes 44, 46 are aligned in parallel with each other in the front and rear direction on a first layer 41a, which is the outermost surface of the accordion folded part 41, and penetrate the first layer 41a, respectively.

Figure 6:
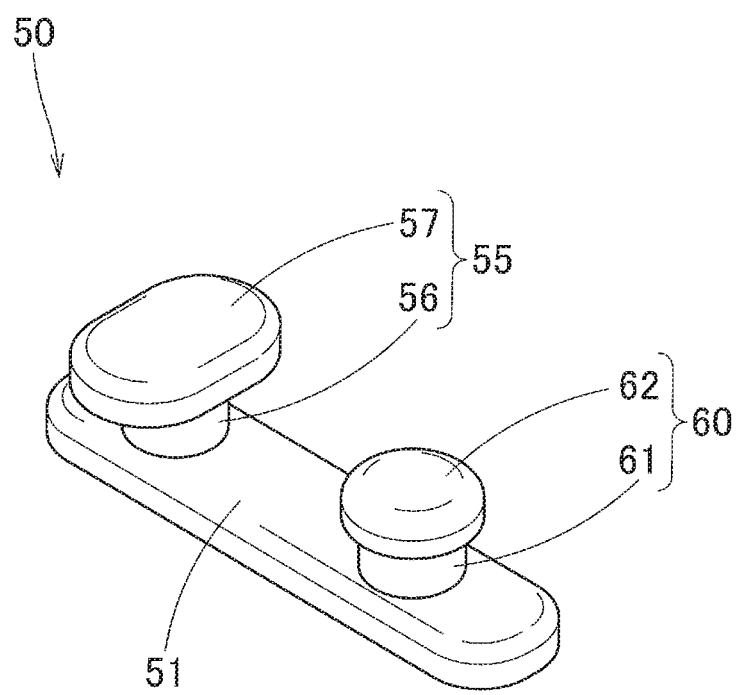
FIG. 6 is a perspective view of an attachment member of the first illustrative embodiment.

As shown in FIGS. 6, 7A and 7B, the attachment member 50 is made of synthetic resin such as polyolefin-based thermoplastic elastomer and is configured by an attachment pin 55 and a positioning pin 60 protruding from a substantially rectangular plate-shaped attachment substrate 51 extending in the front and rear direction. The attachment pin 55 has a neck part 56 having a circular column shape and protruding from the attachment substrate 51 in a direction perpendicular to the attachment substrate 51 and an engaging head part 57 protruding with being bulged at a tip end of the neck part 56. In the first illustrative embodiment, the engaging head part 57 is formed to protrude in a circular disc shape (an elliptical plate shape) at the tip end of the neck part 56. The positioning pin 60 also has a neck part 61 having a circular column shape and protruding from the attachment substrate 51 in the direction perpendicular to the attachment substrate 51 and an engaging head part 62 protruding with being bulged in a circular disc shape at a tip end of the neck part 61. The attachment pin 55 and the positioning pin 60 have such shapes that the neck part 56 is thicker and longer than the neck part 61 and the engaging head part 57 has a larger outer diameter dimension protruding from the neck part 56 than an outer diameter dimension of the engaging head part 62 protruding from the neck part 61.

The above dimension difference between the attachment pin 55 and the positioning pin 60 is made because while the attachment pin 55 is required to be engaged to an engaging hole (attachment hole) 78 of an attachment part 77 (which will be described later) of the case 70 so as not to separate from the attachment part 77 upon the inflation of the airbag 19, the positioning pin 60 has only to be inserted and engaged to the insertion hole 46 of the bag main body 20 so that the attachment member 50 cannot rotate about the attachment pin 55 inserted in the insertion hole 44.

For this reason, since the insertion hole 46 of the bag main body 20 has only to engage with the small engaging head part 62 of the positioning pin 60 at the peripheral edge thereof, the insertion hole 46 is set to have an opening diameter slightly smaller than the engaging head part 62. Also, the insertion hole 44 is set to have an opening diameter equivalent to or slightly smaller than the engaging head part 57 so as to easily insert therein the engaging head part 57 of the attachment pin 55 to be engaged to the engaging hole 78 of the attachment part 77.

In the meantime, the attachment member 50 is attached to the attachment seat 43 of the folded body 40 by folding the bag main body 20 to form the folded body 40, enabling the neck parts 56, 61 and the engaging head parts 57, 62 of the attachment pin 55 and the positioning pin 60 to pass through the insertion holes 44, 46 from a backside of the first layer 41a, arranging the attachment substrate 51 between the first layer 41a and a second layer 41c between the fold lines 41b, 41d of the accordion folded part 41 and wrapping predetermined places of the folded body 40 with a plurality of wrapping materials 65 provided so as to prevent collapse of the folded state and configured by a breakable adhesive tape or the like (refer to FIG. 4B).

As shown in FIGS. 1 to 3, 5, 7A and 7B, the case 70(F, B) is configured to accommodate therein the folded airbag 19 (the bag main body 20, i.e., the folded body 40) and has a long shape extending in the front and rear direction and having an opening 70a through which the airbag 19 can protrude upon the downward deployment and inflation so as to have an inverted U-shaped section. In the first illustrative embodiment, the case 70F configured to accommodate therein the front protection put 23 of the folded bag main body 20 and the case 70 9 configured to accommodate therein the rear protection part 24 are used. Each of the cases 70(70F, 70B) is made of synthetic resin such as polyolefin-based thermoplastic elastomer, and has an inverted U-shaped section having a ceiling wall part 71 having a half divided circular column shape and a vertical wall part 72 extending from an edge 71b of the vehicle exterior-side O of the ceiling wall part 71. In the meantime, the case 70F has a front end, which is bent downward in correspondence to the upper edge-side of the front seat window W1, and the case 70B has a substantially linear shape extending in the front and rear direction, in correspondence to the upper edge-side of the rear seat window W2.

A plurality of attachment piece parts 75 extending upward is arranged in the vicinity of an upper part of each ceiling wall part 71 (refer to FIGS. 2 and 5). The attachment piece parts 75 are respectively arranged at positions corresponding to the attachment piece parts 31B, 31C, 31D, 31E, 31F of the bag main body 20 to be accommodated, and boundary parts of base parts thereof with the ceiling wall part 71 at the vehicle interior-side 1 are formed with through-holes 73 having a slit shape through which the attachment piece parts 31B, 31C, 31D, 31E, 31F are respectively to protrude upward. In the meantime, the vicinity of the attachment piece part 31A of the front end of the bag main body 20 is configured to protrude forward from the case 70F without being accommodated in the case 70F.

As shown in FIGS. 2 and 5, each attachment piece part 75 is formed with an insertion hole 75a through which the attachment bolt 16 is to pass, so as to correspond to the attachment piece part 31 to which the attachment bracket 15 of the bag main body 20 is attached. Also, a restraint piece 75b having an L-shaped section protruding toward the vehicle interior-side 1 and inverted downward is respectively arranged at both front and rear corners of the upper edge-side of each attachment piece part 75. In the state where the folded bag main body 20 is accommodated in the cases 70F, 70B, the attachment piece part 31 having the attachment bracket 15 attached thereto is arranged on a vehicle interior-side surface 75c of each attachment piece part 75 via the through-hole 73 and a surface of the vehicle interior-side 1 of each attachment piece part 31 (a surface of the attachment bracket 15) is engaged to the restraint piece 75b. As a result, each attachment piece part 31 having the attachment bracket 15 attached thereto is sandwiched between the restraint piece 75b and the vehicle interior-side surface 75c of the attachment piece part 75 and is attached to each attachment piece part 75 of the cases 70F, 70B.

As shown in FIGS. 3, 7A and 7B, an attachment part 77 corresponding to the attachment member 50 is formed between the predetermined attachment piece parts 75, 75 of the cases 70F, 70B. The attachment part 77 has an engaging hole (attachment hole) 78 engaging with the engaging head part 57 of the attachment pin 55 at a peripheral edge and having an opening diameter, which is equivalent to the outer diameter dimension of the neck part 56, a guide concave part 79 configured to guide the neck part 56 into the engaging hole 78, and an accommodation part 80 configured to accommodate therein the positioning pin 60 protruding from the folded body 40. The engaging hole 78 is formed to penetrate the ceiling wall part 71, the guide concave part 79 has a narrow part 79b of which a width dimension is reduced from a wide part 79a arranged at an opening-side edge 71a of the ceiling wall part 71, and the narrow part 79b is formed to have an opening width capable of inserting the neck part 56 into the engaging hole 78 but engaging with the neck part 56. The accommodation part 80 is formed by providing a concave part, which is concave upward from the opening-side edge 71a of the ceiling wall part 71.

A process of mounting the head protection airbag device M1 of the first illustrative embodiment to the vehicle V is schematically described. First, as shown in FIG. 4A, the bag main body 20 is deployed flat in a non-inflation state and is then folded. As described above, during the folding, an area from the upper edge 20a to the gas supply path part 25 is configured as the accordion folded part having the fold lines parallel with the upper edge 20a, and an area to the lower edge 20b is configured as the roll folded part Where the lower edge 20b is rolled at the vehicle exterior-side wall part 21b-side (refer to FIG. 2).

After the folding, the engaging head part 57 and the neck part 56 of the attachment pin 55 are inserted through the insertion hole 44 of the attachment seat 43 from the backside of the first layer 41a, and the engaging head part 62 and the neck part 61 of the positioning pin 60 are inserted through the insertion hole 46, so that the attachment substrate 51 of the attachment member 50 is arranged between the first layer 41a and the second layer 41c and then the wrapping materials 65 for preventing collapse of folding are wrapped at the predetermined places of the folded body 40 (refer to FIG. 4B).

Then, the inflator 10 having the attachment bracket 11 attached thereto is joined to the connection port part 26 by using the clamp 13, and the attachment bracket 15 is swaged and attached to each attachment piece part 31.

The area of the front protection part 23 of the bag main body 20 of the folded body 40 is accommodated in the case 70F and the area of the rear protection part 24 is accommodated in the case 70B. At this time, as shown in FIGS. 7A and 7B, the neck part 56 of the attachment pin 55 of each attachment member 50 is inserted from the wide part 79a of the guide concave part 79 into the engaging hole 78 via the narrow part 79b, the engaging head part 57 is arranged so that the backside of the engaging head part 57 facing toward the neck part 56 is to be arranged at a position at which it is to be engaged to the peripheral edge of the engaging hole 78, and the engaging head part 62 of the positioning pin 60 protruding from the folded body 40 is accommodated in the accommodation part 80.

Also, when accommodating the folded body 40 in the cases 70F, 70B, the respective attachment piece parts 31B, 31C, 31D, 31E, 31F having the attachment brackets 15 attached thereto are inserted into the through-holes 73 and are arranged on the vehicle interior-side surfaces 75c of the predetermined attachment piece parts 75. At this time, each of the attachment piece parts 31B, 31C, 31D, 31E, 31F is sandwiched between the restraint piece 75b and the vehicle interior-side surface 75c and is attached to each attachment piece part 75 of the cases 70F, 70B, together with the attachment bracket 15.

When accommodating the folded body 40 in the cases 70F, 70B, the region of the attachment piece parts 31(C, D, E, F) are inserted into the through-holes 73 of the cases 70F, 70B and are attached to the attachment piece parts 75. Therefore, positional misalignment of the folded body 40 in the front and rear direction in the vicinity of the attachment piece parts 31(C, D, E, F) with respect to the cases 70(F, B) and angle misalignment in a circumferential direction about a sectional center C (refer to FIG. 2) of the folded body 40 are prevented. At the same time, also in the vicinity of the attachment seats 43, the attachment members 50 are attached to the attachment parts 77, so that positional misalignment of the folded body 40 in the front and rear direction in the vicinity of the attachment seats 43 with respect to the cases 70(F, B) and angle misalignment in the circumferential direction about the sectional center C (refer to FIG. 3) of the folded body 40 are prevented. Thereby, the folded body 40 is accommodated in the cases 70(F, B) with high attachment precision (with high arrangement position precision).

When mounting the head protection airbag device M1 to the vehicle V, the respective attachment brackets 11, 15 are arranged at predetermined positions of the inner panel 2 and are fixed to the predetermined positions of the inner panel 2 by using the attachment bolts 12, 16, so that the head protection airbag device M1 can be attached to the vehicle V. Thereafter, the inflator 10 is coupled with a lead wire (not shown) extending from a control device for inflation activation, and the front pillar garnish 5, the roof head lining 6, the intermediate pillar garnish 7 and the rear pillar garnish 8 are attached to the inner panel 2 of the body 1-side, so that the mounting of the head protection airbag device M1 to the vehicle V is completed.

After the mounting to the vehicle V, when the head protection airbag device M1 of the first illustrative embodiment is activated and the inflator 10 thus supplies the inflation gas G into the airbag 19 (the bag main body 20), the bag main body 20 enables the inflation gas G to flow into the gas supply path part 25, the front protection part 23 and the rear protection part 24 and pushes and deploys downward the airbag cover 9, thereby completing the deployment and inflation so as to cover the vehicle interior-side of the windows W1, W2, the intermediate pillar part CP and the rear pillar part RP, as shown with the dashed-two dotted line in FIG. 1.

Since the large-diameter engaging head part 57 is engaged to the engaging hole 78 of the attachment part 77 of the case 70 at the upper edge 29a of the peripheral edge part 29 of the bag main body 20 and the attachment pin 55 of the attachment member 50 is thus attached to the case 70, the attachment pin 55 does not separate from the case 70 upon the deployment and inflation of the bag main body 20. For this reason, the vicinity of the attachment seat 43 of the airbag 19 does not separate from the case 70 and the attachment member 50 does not also separate from the case 70, so that the airbag 19 (the bag main body 20) smoothly deploys and inflates to receive and protect a head of a passenger. In the meantime, upon the inflation of the airbag 19, the attachment pin 55 is applied with a tensile force along the axial direction of the neck part 56, so that the engaging head part 57 is engaged to the peripheral edge of the engaging hole 78 of an outer surface 77a (refer to FIGS. 7A and 7B) of the attachment part 77 and is thus prevented from separating from the case 70.

In the meantime, upon the deployment and inflation of the airbag 19, since the attachment piece part 31 mainly faces the tensile force upon the deployment and inflation of the airbag 19, the attachment pin 55 is not applied with the high tensile force in a direction of separating from the engaging hole 78, so that the airbag 19 (the bag main body 20) deploys and inflates to receive and protect the head of the passenger.

As described above, according to the head protection airbag device M1 of the first illustrative embodiment, when the attachment substrate 51 of the attachment member 50 is arranged at a backside peripheral edge 45 of the insertion hole 44 formed in the folded body 40 of the bag main body 20 and the neck part 56 and the engaging head part 57 are arranged to protrude from the insertion hole 44 toward an outer surface 43a, the attachment member 50 can be attached to the folded body 40. Also, when the engaging head part 57 of the attachment member 50 is inserted and engaged to the engaging hole 78 of the attachment part 77 of the case 70, the folded body 40 can be attached to the attachment part 77 at a position along the longitudinal direction of the folded body 40, which is a predetermined arrangement position, without rotating the folded body.

That is, when the attachment substrate 51 is arranged at the backside peripheral edge 45 of the insertion hole 44 simply by inserting the engaging head part 57 and the neck part 56 into the insertion hole 44 so as to pass through the insertion hole 44 of the bag main body 20 (the folded body 40), the attachment member 50 can be conveniently attached to the bag main body 20. Also, when the engaging head part 57 is simply inserted and engaged to the engaging hole 78 of the predetermined attachment part 77, the bag main body 20 can be attached to the predetermined attachment part 77, which is a predetermined arrangement position, without rotating the bag main body.

Therefore, according to the head protection airbag device M1 of the first illustrative embodiment, it is possible to conveniently attach the folded airbag 19 (the bag main body 20) to the predetermined attachment part 77 without the positional misalignment.

Also, according to the head protection airbag device M1 of the first illustrative embodiment, the attachment substrate 51 of the attachment member 50 is arranged to extend in the longitudinal direction of the folded body 40, and the attachment substrate 51 has the configuration where the neck part 56 having the engaging head part 57 provided at the tip end protrudes and the positioning pin 60 as a protrusion protruding toward the outer surface 43a of the folded body 40 is arranged so as to prevent the attachment substrate 51 from rotating about at least the neck part 56.

For this reason, in the first illustrative embodiment, the attachment member 50 is attached to the folded body 40 without rotating about the neck part 56, and the attachment substrate 51 can be arranged long in the longitudinal direction of the folded body 40 at the backside of the peripheral edge (the backside peripheral edge) 45 of the insertion hole 44. That is, the attachment substrate 51 can be arranged long at the backside peripheral edge 45 of the insertion hole 44, so that there is no concern that the attachment member 50 will separate from the insertion hole 44 of the bag main body 20 (the folded body 40). For this reason, in the state where the engaging head part 57 is inserted and engaged to the engaging hole (the attachment hole) 78 of the predetermined attachment part 77, the attachment member 50 can stably press the peripheral edge 45 of the insertion hole 44 of the bag main body 20 toward the attachment part 77, so that upon the deployment and inflation of the bag main body 20, the bag main body 20 stably deploys and inflates without separating from the attachment part 77 and the separation of the attachment member 50 from the bag main body 20 is also correctly prevented.

Figure 8:
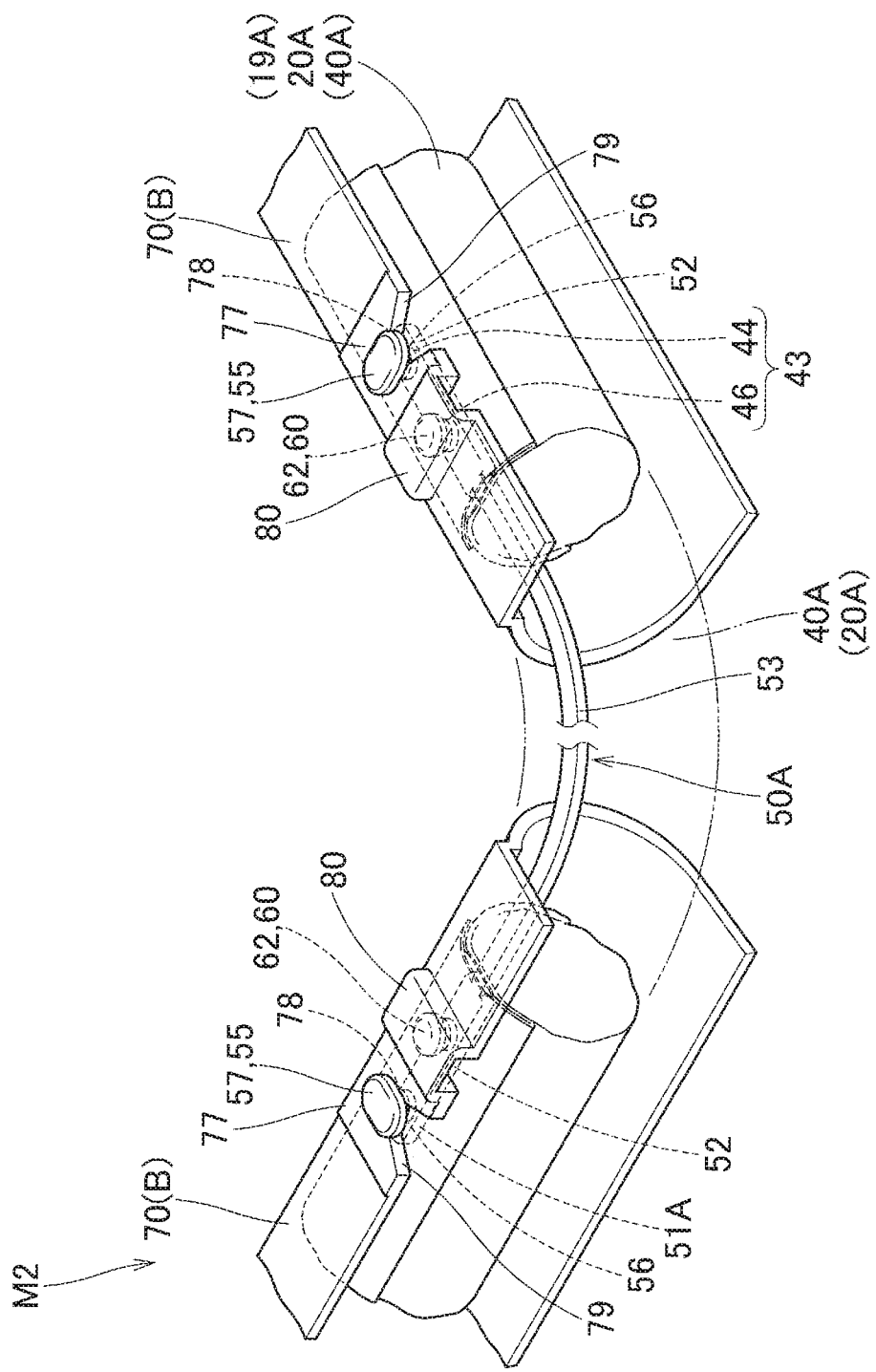
FIG. 8 is a schematic perspective view depicting an airbag and a case of a head protection airbag device of a second illustrative embodiment.
Figure 9:
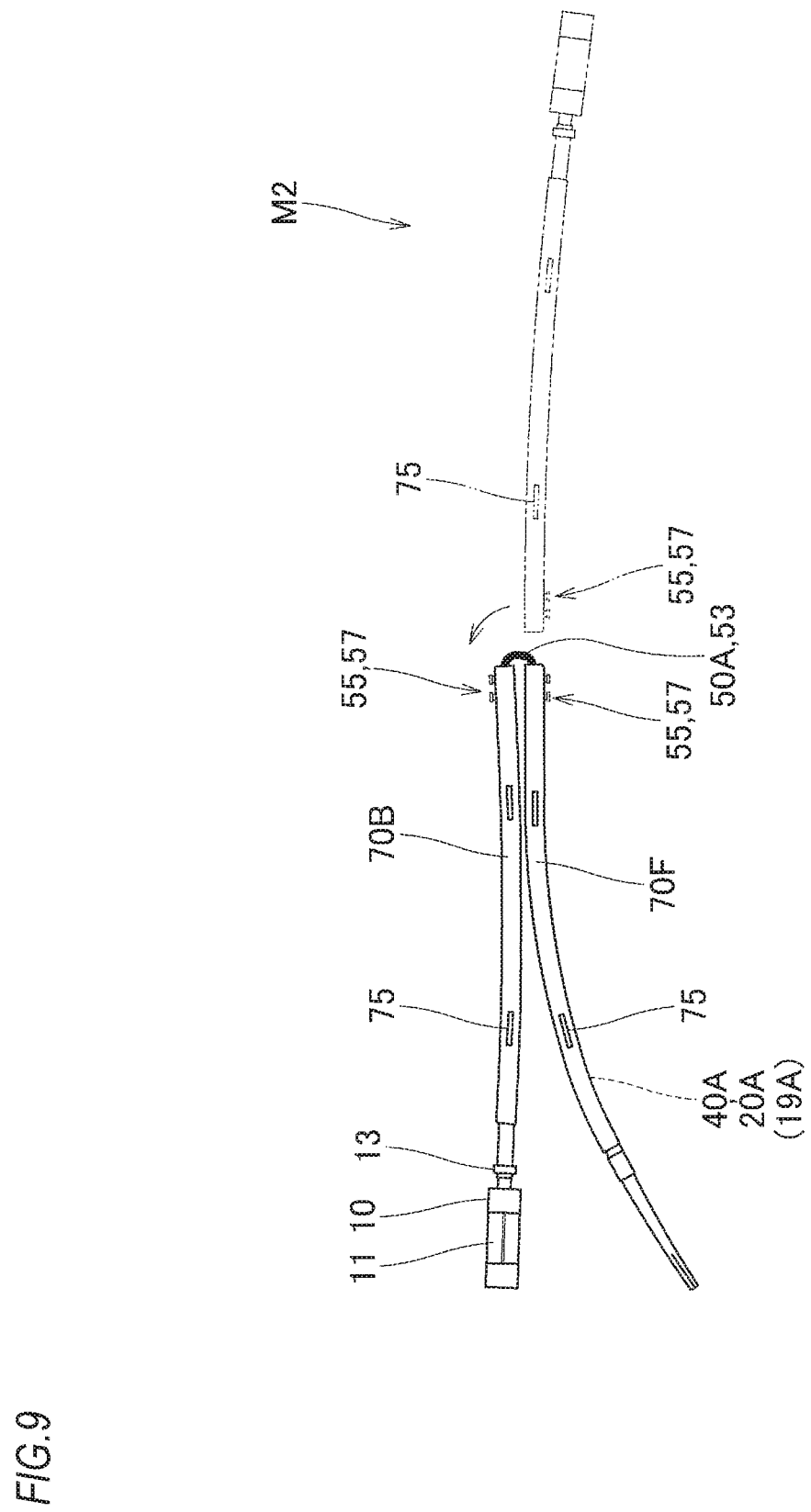
FIG. 9 is a schematic plan view depicting a state where a folded body of a bag main body of the head protection airbag device of the second illustrative embodiment is bent.

Also, when the case configured to accommodate therein the airbag is formed with the attachment part, a configuration like a head protection airbag device M2 of a second illustrative embodiment shown in FIGS. 8 and 9 may be adopted.

In the airbag device M2, a plurality of (two, in the shown example) cases 70F, 70B configured to accommodate therein a folded body 40A is arranged in the longitudinal direction of the folded body 40A, an attachment member 50A has the engaging head parts 57 that are to be inserted and engaged to the engaging holes 78 formed in the adjacent cases 70F, 70B, an attachment substrate 51A of the attachment member 50A has a coupling part 53 that is arranged between the adjacent cases 70F, 70B, and the coupling part 53 is formed to permit bending deformation and to restrain torsion deformation. That is, the attachment member 50A of the second illustrative embodiment is formed of synthetic resin such as polyolefin-based thermoplastic elastomer, like the attachment member 50, and the attachment substrate 51A has a configuration where substrate parts 52, 52, from which the attachment pins 55 each of which has the neck part 56 and the engaging head part 57 protrude, are coupled by the band-shaped coupling part 53. The coupling part 53 has a band shape having a plate thickness and a width dimension set so that the bending deformation is permitted in a direction (a protruding direction of the attachment pin 55) perpendicular to the substrate part 52 but the torsion deformation is not permitted until the cases 70F, 70B are rotated one revolution each other.

Also, each of the cases 70F, 70B has the attachment part 77 corresponding to the attachment pin 55 and the positioning pin 60 protruding from each substrate part 52 of the attachment member 50A. That is, the engaging hole 78 having the guide concave part 79 and the accommodation part 80 are provided for each of the cases 70F, 70B. A bag main body 20A of an airbag 19A is also provided with the attachment seat 43 having the insertion holes 44, 46 formed therein in which the attachment pin 55 and the positioning pin 60 can be inserted and engaged.

In the airbag device M2, the bag main body 20A is folded to form the folded body 40A, the attachment pin 55 and the positioning pin 60 are inserted and engaged to each of the corresponding attachment seats 43 of the folded body 40A, the wrapping material 65 is wrapped to attach the attachment member 50A to the folded body 40A, the inflator 10 is then attached and the folded body 40A having the attachment member 50A attached thereto is accommodated in the cases 70F, 70B, like the first illustrative embodiment. That is, each attachment pin 55 of the attachment member 50A is engaged to the engaging hole 78, the positioning pin 60 is accommodated in the accommodation part 80, and each attachment piece part 31 having the attachment bracket 15 attached thereto is attached to each attachment piece part 75 through the through-hole 73, so that the airbag device M2 is assembled.

In the head protection airbag device M2 of the second illustrative embodiment, as shown in FIG. 9, the airbag 19A accommodated in the cases 70F, 70B can be bent without distorting the same at the coupling part 53, so that it is possible to compactly carry and store the bent airbag 19A accommodated in the cases 70F, 70B before the mounting to the vehicle. Also, since the airbag is not distorted between the cases 70F, 70B, it is possible to mount the cases 70F, 70B having the folded airbag 19A accommodated therein to the vehicle at an appropriate posture without causing the torsion between the cases 70F, 70B upon the mounting to the vehicle.

Figure 10:
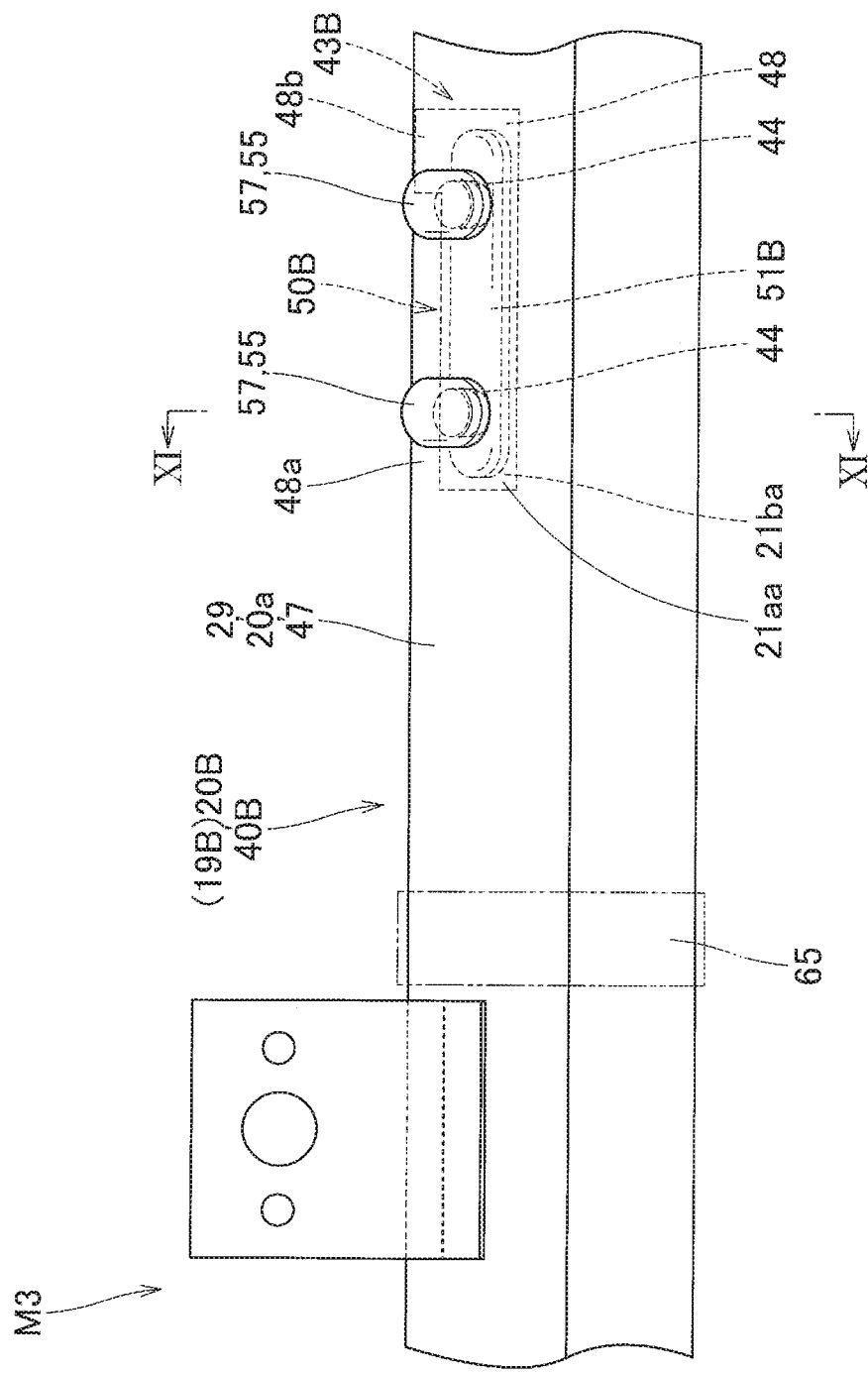
FIG. 10 is a schematic partial enlarged front view depicting an airbag of a head protection airbag device of a third illustrative embodiment.
Figure 11:
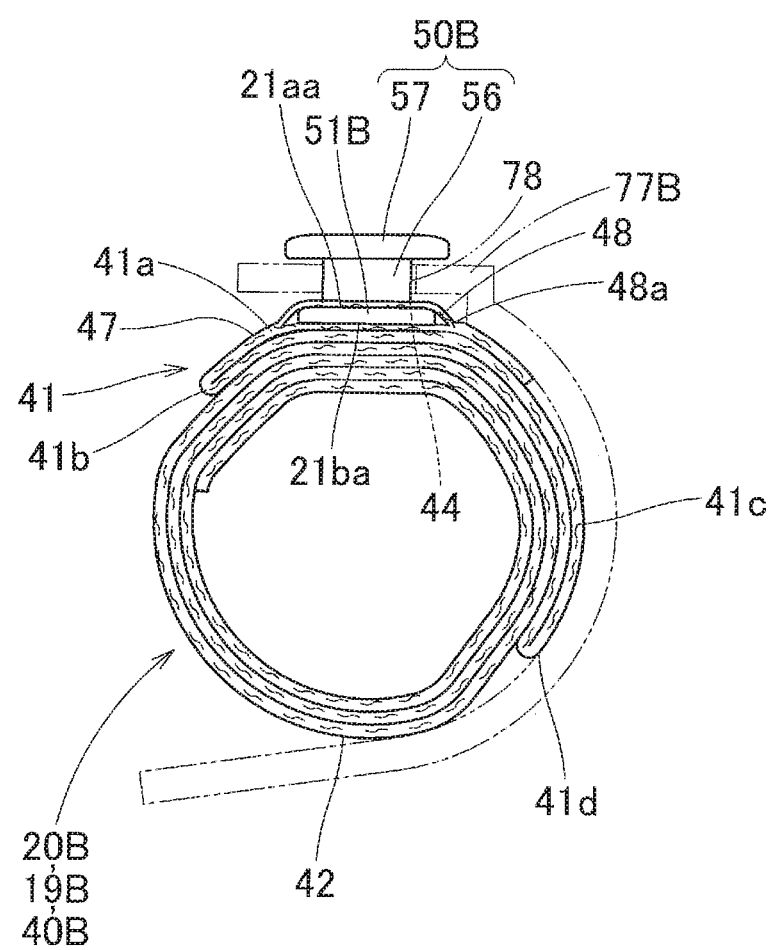
FIG. 11 is a schematic sectional view taken along a line XI-XI of FIG. 10, depicting the airbag of the head protection airbag device of the third illustrative embodiment.
Figure 12:
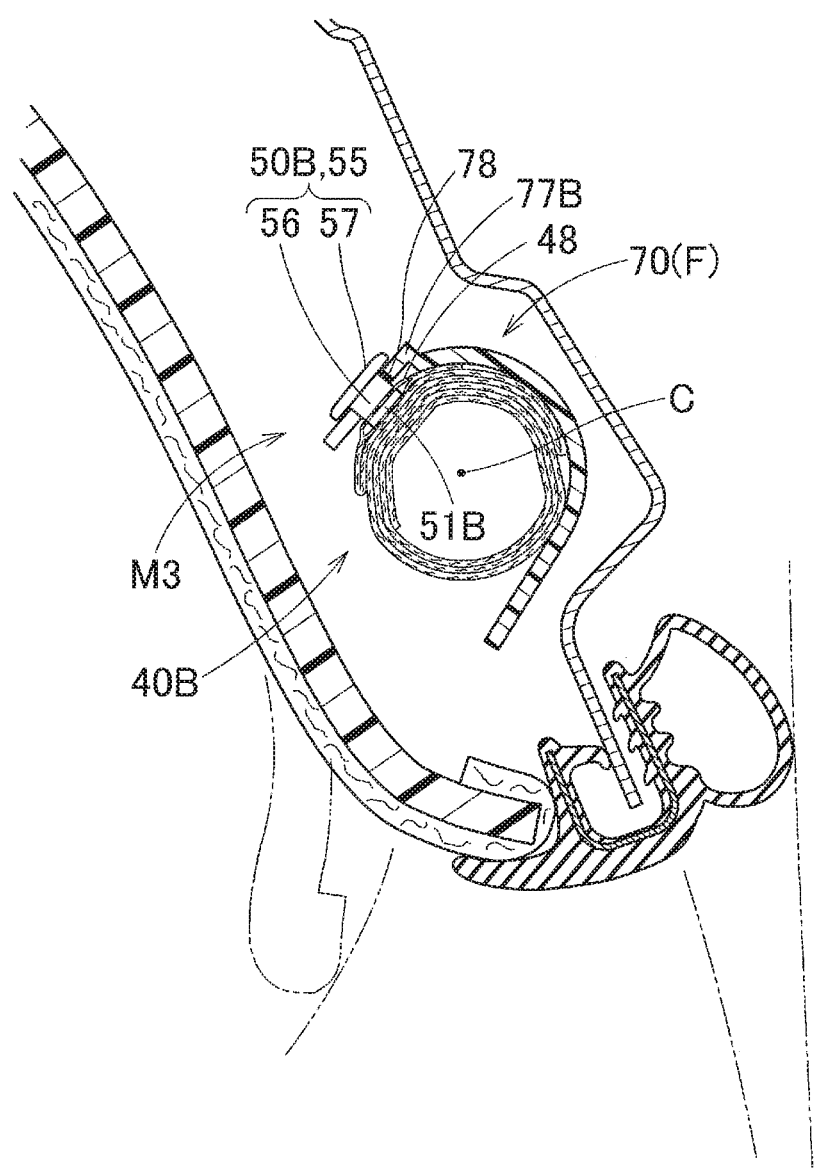
FIG. 12 is a schematic longitudinal sectional view depicting a state where the head protection airbag device of the third illustrative embodiment is mounted to the vehicle.

Also, the attachment part for attaching the attachment member to the bag main body may be configured, like a head protection airbag device M3 of a third illustrative embodiment shown in FIGS. 10 to 12. In the third illustrative embodiment, a bag main body 20B of an airbag 19B has an attachment seat 43B, which an attachment member 50B is to be attached thereto and is provided by using two double woven fabric parts.

That is, in the bag main body 20B of the airbag 19B, the upper edge 29a of the peripheral edge part 29 to which the attachment seat 43B is provided is provided at the periphery thereof with a closing part 47, which is a boundary part into which the inflation gas G is not to flow, between the upper edge and the protective inflation part 22 of the double woven gas inflow part 21. Thereby, a vehicle interior-side wall part 21aa and a vehicle exterior-side wall part 21ba can be spaced from each other. Also, a space 48 for attachment seat is provided between the vehicle interior-side wall part 21aa and the vehicle exterior-side wall part 21ba. In the space 48 for attachment seat, an insertion opening 48b for the attachment member 50B is provided at a part of the upper edge 48a, so that the attachment member 50B can be inserted in the space 48 for attachment seat.

In the space 48 for attachment seat, a region of the vehicle interior-side wall part 21aa configures the attachment seat 43B, and the insertion holes 44 through which the attachment pins 55 of the attachment member 50B are to pass are arranged.

The attachment member 50B is provided with the two protruding attachment pins 55, and the attachment seat 43B is formed with the two insertion holes 44. In the meantime, an attachment substrate 51B of the attachment member 50B has a rectangular plate shape that is to be accommodated in the space 48 for attachment seat, and the attachment member 50B is attached to the folded body 40B of the bag main body 20B so as not to be rotatable about one attachment pin 55.

Each attachment pin 55 is inserted and engaged to the engaging hole (the attachment hole) 78 of an attachment part 77B provided to the case 70, so that the folded body 40B formed by folding the bag main body 20B of the airbag 19B is attached to the case 70 in a state where the positional misalignment in the front and rear direction and the angle misalignment in the circumferential direction about the sectional center C are prevented by the attachment member 50B. As described above, the attachment member 50B may be configured to be attached to the inside of the double woven fabrics.

Figure 13:
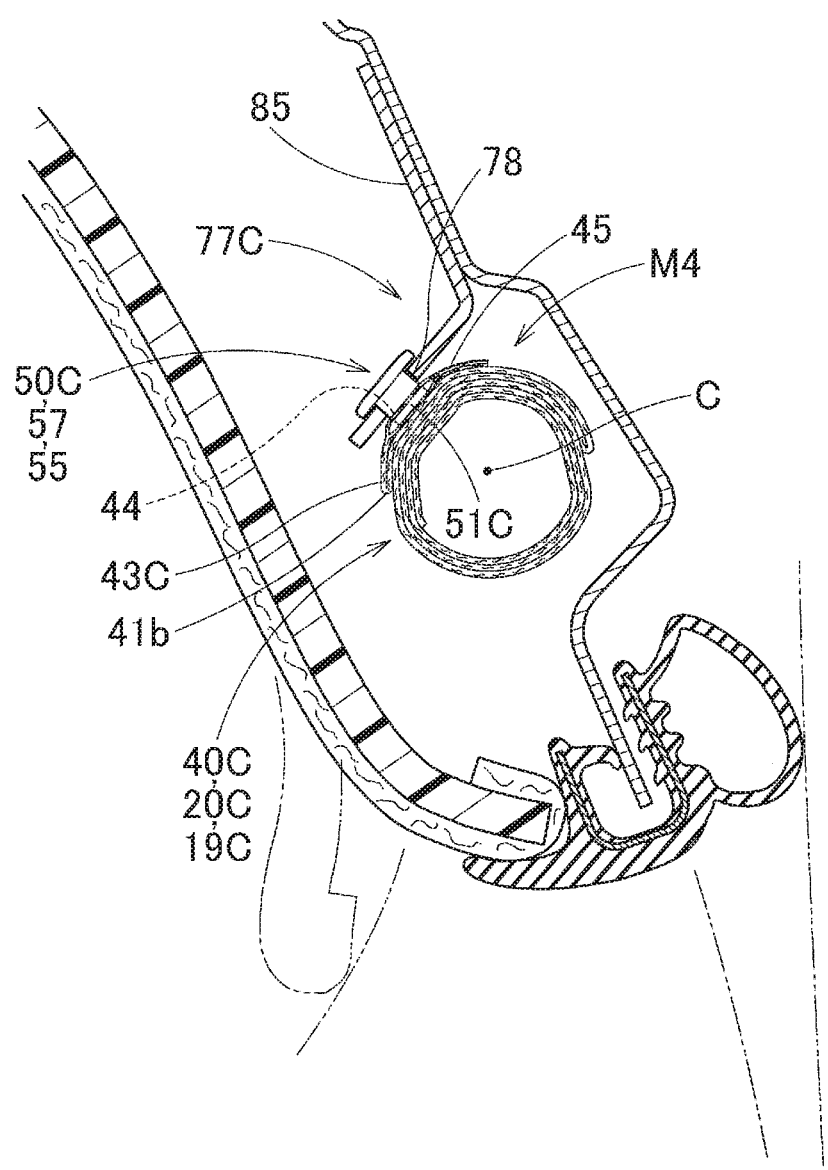
FIG. 13 is a schematic longitudinal sectional view depicting a state where a head protection airbag device of a fourth illustrative embodiment is mounted to the vehicle.
Figure 14A:
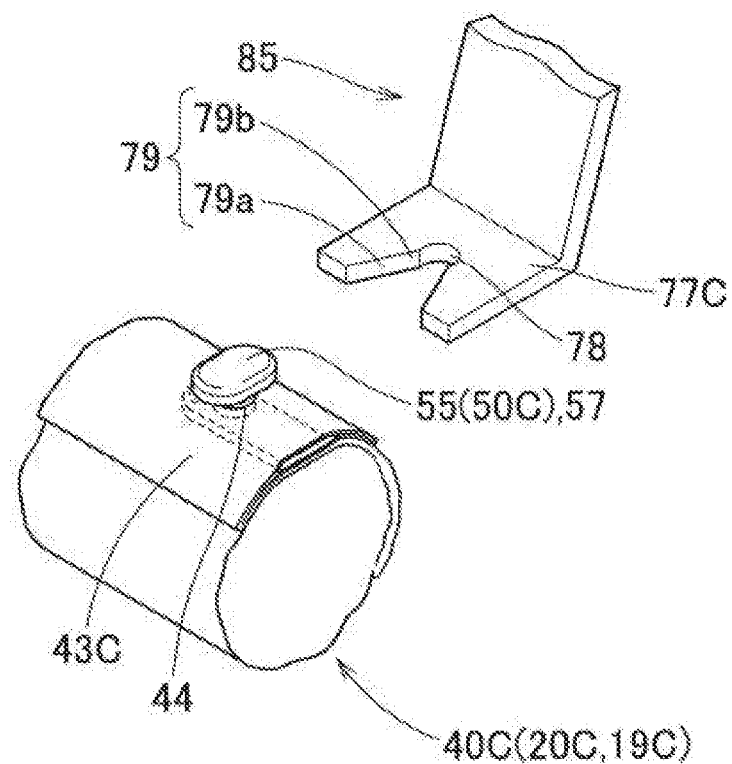
FIGS. 14A and 14B are schematic perspective views depicting an attachment member of the airbag and an attachment part of a body-side of the fourth illustrative embodiment.
Figure 14B:
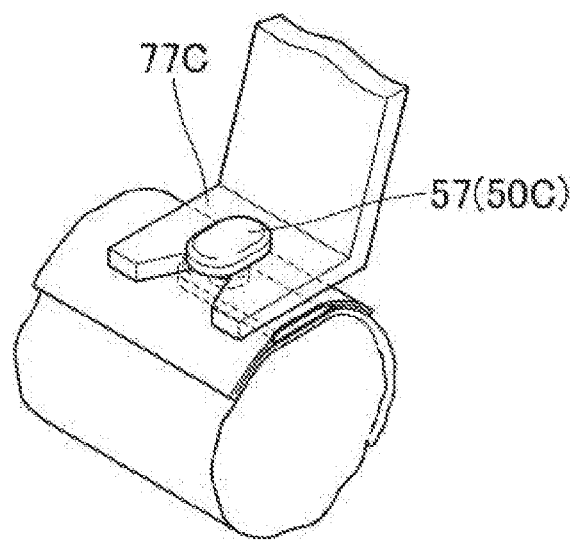

Also, in the respective illustrative embodiments M1, M2, M3, as the attachment part 77; 77B for the attachment member 50; 50A; 50B, the region of the case 70 configured to accommodate therein the folded body 40; 40A; 40B has been exemplified. However, like a head protection airbag device M4 of a fourth illustrative embodiment shown in FIGS. 13, 14A and 14B, as an attachment part 77C for an attachment member 50C, the body 1 of the vehicle may be provided with the engaging hole (the attachment hole) 78.

In the head protection airbag device M4 of the fourth illustrative embodiment, a bag main body 20C of an airbag 19C is similar to the bag main body 20 of the first illustrative embodiment. However, the engaging head part 57 of the attachment pin 55 of the attachment member 50C attached to the attachment seat 43C is engaged to the attachment part 77C having the engaging hole (the attachment hole) 78 provided to an attachment bracket 85 fixed to the body 1-side by welding or the like, without using the case.

Also, the attachment member 50C is attached to the attachment seat 43C by arranging the neck part 56 and the engaging head part 57 of the attachment pin 55 in the insertion hole 44 of the attachment seat 43C of the folded body 40C of the bag main body 20C so as to protrude from the backside peripheral edge 45, and inserting the positioning pin 60 into the insertion hole 46 (not shown). The attachment piece part 31 having the attachment bracket 15 is fixed to the inner panel 2 by the bolt 16 and the engaging head part 57 of the attachment member 50C is inserted and engaged to the engaging hole 78 of the attachment part 77C provided to the attachment bracket 85, so that the bag main body 20C is attached to the body 1-side of the vehicle. In the vicinity of the attachment seat 43C of the airbag 19C, the engaging head part 57 of the attachment member 50C is inserted and engaged to the engaging hole 78 of the attachment part 77C, so that the folded body 40C is attached to the body 1-side at the predetermined arrangement position in the state where the positional misalignment of the folded body 40C in the front and rear direction with respect to the body 1 is prevented and the angle misalignment in the circumferential direction of the sectional center C is also prevented.

Also, as the attachment member, like an attachment member 50D of a head protection airbag device M5 of a fifth illustrative embodiment shown in FIG. 15, an attachment substrate 51D may be formed to extend long, in correspondence to a substantially entire length of a folded body 40D formed by folding the bag main body 20D, or like an attachment member 50E of a head protection airbag device M6 of a sixth illustrative embodiment shown in FIG. 16, an attachment substrate 51E may be formed to extend long by each length dimension formed by dividing a substantially entire length of a folded body 40E into a plurality of parts. In this case, the upper edge 20a-side of the bag main body 20D; 20E is formed with a plurality of insertion holes 44 and is provided with the long attachment seat 43D; 43E, the engaging head part 57 of the attachment pin 55 protruding from the corresponding attachment substrate 51D; 51E is inserted into the insertion hole 44 from the backside peripheral edge 45 together with the neck part 56 (not shown) and is arranged to protrude from the insertion hole 44, so that the attachment member 50D; 50E is attached to the bag main body 20D; 20E. In the case of the folded body 40D; 40E having the attachment member 50D; 50E attached thereto, when the engaging head part 57 is inserted and engaged to the engaging hole of the attachment part provided to the body 1-side, without using the case 70 of the first illustrative embodiment, the region of the attachment seat 43D; 43E may be attached to the body 1-side at the predetermined arrangement position while preventing the positional misalignment in the front and rear direction with respect to the body 1-side and the angle misalignment in the circumferential direction of the sectional center of the folded body 40D; 40E.

In the meantime, an airbag 19E shown in FIG. 16 has a configuration where the connection port part 26 for connection to the inflator is arranged at a central part of the bag main body 20E in the front and rear direction.

Also, in the attachment member 50D; 50E, a concave part 54 is preferably provided at the arrangement region of the attachment piece part 31 or the connection port part 26 so as to prevent the interference with the attachment piece part 31 or the connection port part 26 upon the inflation of the airbag 19D; 19E (refer to FIGS. 15 and 16).

According to an aspect of the invention, there is provided a head protection airbag device comprising an airbag accommodated with being folded in an upper edge-side of a window of a vehicle and configured to deploy and inflate so as to cover the window upon inflow of an inflation gas, wherein the airbag includes: a bag main body; and an attachment member configured to attach the bag main body having been folded to a predetermined attachment part, the attachment member includes: an attachment substrate; a neck part protruding from the attachment substrate; and an engaging head part arranged with being bulged at a tip end of the neck part, and inserted in and engaged to the predetermined attachment part, the bag main body has an insertion hole in Which the neck part is inserted so as to enable the engaging head part to protrude from an outer surface-side of a folded body of the bag main body having been folded, and the attachment substrate is arranged at a backside of a peripheral edge of the insertion hole so that the attachment member is attached to the bag main body.

According to the head protection airbag device of the present invention, when the attachment substrate of the attachment member is arranged at the backside of the peripheral edge of the insertion hole formed in the folded body of the bag main body, and the neck part and the engaging head part protrude from the insertion hole toward the outer surface-side, the attachment member can be attached to the folded body. Also, when the engaging head part of the attachment member is inserted and engaged to the engaging hole (attachment hole) of the predetermined attachment part of a case, a body of the vehicle or the like, the folded body can be attached to the attachment part at a position along the longitudinal direction of the folded body, which is a predetermined arrangement position, without rotating the folded body.

That is, when the attachment substrate is arranged at the backside peripheral edge of the insertion hole simply by inserting the engaging head part and the neck part into the insertion hole so as to pass through the insertion hole of the bag main body (the folded body), the attachment member can be conveniently attached to the bag main body. Also, when the engaging head part is simply inserted in and engaged to the engaging hole of the predetermined attachment part, the bag main body can be attached to the predetermined attachment part, which is a predetermined arrangement position, without rotating the bag main body.

Therefore, according to the head protection airbag device of the present invention, it is possible to conveniently attach the folded airbag to the predetermined attachment part without the positional misalignment.

As the predetermined attachment part, the case configured to accommodate therein the folded body may be formed with the engaging hole (attachment hole) or the body of the vehicle may be formed with the engaging hole (attachment hole). That is, the case may have an opening through which the bag main body can protrude upon the deployment and inflation, and may be formed with an engaging hole, in which the engaging head part is inserted and to which the engaging head part is engaged, so as to configure the predetermined attachment part. Also, when the engaging head part of the attachment member is inserted in and engaged to the engaging hole of the attachment part provided to the body to which the airbag is to be mounted, the body of the vehicle can configure the predetermined attachment part.

Also, when the case configured to accommodate therein the airbag is formed with the predetermined attachment part, a plurality of the cases may be arranged in a longitudinal direction of the folded body, the attachment member may have the engaging head parts that are to be inserted in and engaged to the engaging holes formed in the cases adjacent to each other, the attachment substrate of the attachment member may have a coupling part arranged between the adjacent cases, and the coupling part may be formed to permit bending deformation and to restrain torsion deformation.

In the above configuration, the airbag accommodated in the cases can be bent without distorting the same at the coupling part, so that it is possible to compactly carry and store the bent airbag accommodated in the cases before mounting to the vehicle. Also, since the airbag is not distorted between the cases, it is possible to mount the cases having the folded airbag accommodated therein to the vehicle at an appropriate posture without causing the torsion between the cases upon the mounting to the vehicle.

The attachment substrate of the attachment member may be arranged to extend in a longitudinal direction of the folded body, and the attachment substrate may have a configuration where the neck part having the engaging head part at the tip end protrudes from the attachment substrate and a protrusion protruding toward the outer surface-side of the folded body is arranged so as to prevent rotation of the attachment substrate about at least the neck part.

In the above configuration, the attachment member is attached to the folded body without rotating about the neck part, and the attachment substrate can be arranged long in the longitudinal direction of the folded body at the backside of the peripheral edge of the insertion hole. That is, the attachment substrate can be arranged long at the backside of the peripheral edge of the insertion hole, so that there is no concern that the attachment member will separate from the insertion hole of the bag main body (the folded body). For this reason, in the state where the engaging head part is inserted and engaged to the engaging hole (attachment hole) of the predetermined attachment part, the attachment member can stably press the peripheral edge of the insertion hole of the bag main body toward the attachment part, so that upon the deployment and inflation of the bag main body, the bag main body smoothly deploys and inflates without separating from the attachment part and the separation of the attachment member from the bag main body is also correctly prevented.

What is claimed is:

1. A head protection airbag device comprising an airbag accommodated with being folded in an upper edge-side of a window of a vehicle and configured to deploy and inflate so as to cover the window upon inflow of an inflation gas, wherein
the airbag includes:
a bag main body; and
an attachment member configured to attach the bag main body having been folded to a predetermined attachment part,
the attachment member includes:
an attachment substrate;
a neck part protruding from the attachment substrate; and
an engaging head part arranged with being bulged at a tip end of the neck part, and inserted in and engaged to the predetermined attachment part,
the bag main body has an insertion hole in which the neck part is inserted so as to enable the engaging head part to protrude from an outer surface-side of a folded body of the bag main body having been folded, and
the attachment substrate is arranged at a backside of a peripheral edge of the insertion hole so that the attachment member is attached to the bag main body, and
wherein the head protection airbag device further comprises: a case configured to accommodate therein the folded body, wherein
the case has an opening through which the bag main body can protrude upon deployment and inflation, and is formed with an engaging hole, in which the engaging head part is inserted and to which the engaging head part is engaged, so as to configure the predetermined attachment part, and wherein
the case includes a plurality of cases which are arranged in a longitudinal direction of the folded body,
the attachment member has engaging head parts inserted in and engaged to engaging holes of the cases which are adjacent to each other,
the attachment substrate of the attachment member has a coupling part arranged between the adjacent cases, and the coupling part is formed to permit bending deformation and to restrain torsion deformation.

2. A head protection airbag device comprising an airbag accommodated with being folded in an upper edge-side of a window of a vehicle and configured to deploy and inflate so as to cover the window upon inflow of an inflation gas, wherein
the airbag includes:
a bag main body; and
an attachment member configured to attach the bag main body having been folded to a predetermined attachment part,
the attachment member includes:
an attachment substrate;
a neck part protruding from the attachment substrate; and
an engaging head part arranged with being bulged at a tip end of the neck part, and inserted in and engaged to the predetermined attachment part,
the bag main body has an insertion hole in which the neck part is inserted so as to enable the engaging head part to protrude from an outer surface-side of a folded body of the bag main body having been folded, and
the attachment substrate is arranged at a backside of a peripheral edge of the insertion hole so that the attachment member is attached to the bag main body, wherein
the attachment substrate of the attachment member is arranged to extend in a longitudinal direction of the folded body; and
the attachment substrate has a configuration where the neck part having the engaging head part at the tip end protrudes from the attachment substrate and a protrusion protruding toward the outer surface-side of the folded body is arranged so as to the prevent rotation of the attachment substrate about at least the neck part.

* * * * *